United States Patent
Minaguchi et al.

(10) Patent No.: US 6,625,013 B2
(45) Date of Patent: Sep. 23, 2003

(54) ELECTRONIC APPARATUS HAVING ANTENNA ELEMENTS FOR USE IN WIRELESS COMMUNICATION

(75) Inventors: Hiroyuki Minaguchi, Higashimatsuyama (JP); Nobuyasu Tajima, Ome (JP); Naohiro Yokoyama, Akishima (JP); Yasuyuki Suzuki, Fussa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/045,066

(22) Filed: Jan. 15, 2002

(65) Prior Publication Data

US 2002/0100807 A1 Aug. 1, 2002

(30) Foreign Application Priority Data

Jan. 16, 2001 (JP) ........................................ 2001-007985

(51) Int. Cl.[7] ................................................ G06F 1/16
(52) U.S. Cl. ...................... 361/683; 360/98.1; 343/702; 364/708.1
(58) Field of Search .......................... 361/683, 680–682, 361/684–687, 724–727; 360/97.01, 98.01; 364/708.1; 343/702

(56) References Cited

U.S. PATENT DOCUMENTS

| | | | | |
|---|---|---|---|---|
| 6,509,877 B2 | * | 1/2003 | Masaki | 343/702 |
| 6,532,148 B2 | * | 3/2003 | Jenks et al. | 361/683 |
| 6,535,172 B2 | * | 3/2003 | Hirabayashi | 345/725 |
| 2001/0030850 A1 | * | 10/2001 | Ditzik | 361/683 |
| 2002/0100807 A1 | * | 8/2002 | Minaguchi et al. | 361/683 |

FOREIGN PATENT DOCUMENTS

| | | |
|---|---|---|
| JP | 2000-172376 | 6/2000 |
| JP | 2000-284854 | 10/2000 |

* cited by examiner

*Primary Examiner*—Darren Schuberg
*Assistant Examiner*—Hung Van Duong
(74) *Attorney, Agent, or Firm*—Finnegan, Henderson, Farabow, Garrett & Dunner, L.L.P.

(57) ABSTRACT

An electronic apparatus includes a main body having a storage section which stores a wireless communication unit and an antenna element for use in wireless communication. An antenna cable is formed between the storage section and the antenna element. The antenna cable has one end led to the storage section, and the one end of the antenna cable is connected to the wireless communication unit. A holding member is fixed in the storage section. The holding member is detachably caught by the one end of the antenna cable to hold the one end of the antenna cable in position in the storage section.

14 Claims, 4 Drawing Sheets

ELECTRONIC APPARATUS HAVING ANTENNA ELEMENTS FOR USE IN WIRELESS COMMUNICATION

CROSS-REFERENCE TO RELATED APPLICATIONS

This application is based upon and claims the benefit of priority from the prior Japanese Patent Application No. 2001-007985, filed Jan. 16, 2001, the entire contents of which are incorporated herein by reference.

BACKGROUND OF THE INVENTION

1. Field of the Invention

The present invention relates to an electronic apparatus, such as a portable computer and a portable information tool, which includes antenna elements for use in wireless communication.

2. Description of the Related Art

Recently, there has been provided an electronic apparatus such as a portable computer to which a wireless communication unit such as Bluetooth™ and a wireless LAN is added. This type of electronic apparatus comprises a main body having a storage section to store a wireless communication unit and a display unit including antenna elements for use in wireless communication. Each of the antenna elements is connected to an antenna cable. The antenna cable runs between the display unit and the main body and its one end, which is opposed to the antenna element, leads to the storage section. The one end of the antenna cable has a connecting terminal. The connecting terminal is connected to an antenna input terminal of the wireless communication unit when the wireless communication unit is stored in the storage section.

When the wireless communication unit is removed from the storage section, the connecting terminal of the antenna cable is not connected to the antenna input terminal but can freely move inside the storage section. If a vibration or a shock is given to the electronic apparatus, it is inevitable that the one end of the antenna cable moves inside the storage section. As a result, there are cases where the connecting terminal of the antenna cable collides with or is caught in a connector and the like, arranged inside or on the inner surface of the storage section. This may damage the terminal and connector.

In order to prevent the damage, conventionally, the one end of the antenna cable is adhered to the inner surface of the storage section using an adhesive tape. This can restrict the free movement of the antenna cable inside the storage section and thus prevent the connecting terminal and connector from being damaged.

However, the use of an adhesive tape necessitates a cumbersome operation of peeling the adhesive tape off the antenna cable or the inner surface of the storage section and disposing of the peeled adhesive tape before the wireless communication unit is stored in the storage section. Thus, the operability is poor and the preparatory operation, which is performed before the wireless communication unit is stored, requires time and trouble.

BRIEF SUMMARY OF THE INVENTION

An object of the present invention is to provide an electronic apparatus whose outward appearance is not poor and in which one end of a cable can easily be fixed in position, the fixing of the cable can quickly be released, and a storage section is not complicated.

In order to attain the above object, an electronic apparatus according to the present invention comprises:

a main body having a storage section which stores a wireless communication unit;

an antenna element for use in wireless communication, arranged at a distance from the storage section;

an antenna cable formed between the storage section and the antenna element, the antenna cable having one end led to the storage section, and the one end of the antenna cable being connected to the wireless communication unit; and a holding member fixed in the storage section, the holding member being detachably caught by the one end of the antenna cable to hold the one end of the antenna cable in position in the storage section.

With the above construction of the electronic apparatus, the holding member holds one end of the antenna cable in position in the storage section. Since, therefore, the one end of the antenna cable cannot be freely moved in the storage section, it can be prevented from being damaged. Moreover, the holding of the antenna cable can be released only by detaching the one end of the antenna cable from the holding member. The operation of releasing the holding of the antenna cable can easily be performed, and a preparatory operation, which is performed before the wireless communication unit is stored in the storage section, requires neither time nor trouble.

In addition, the holding member is fixed in a predetermined position in the storage section, so that the position of the one end of the antenna cable held by the holding member does not vary from product to product. Since the position and shape of the holding member are fixed in the storage section, the storage section is not complicated but its outward appearance can be enhanced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A portable computer according to a first embodiment of the present invention will now be described with reference to FIGS. 1 to 6.

Figure 1:
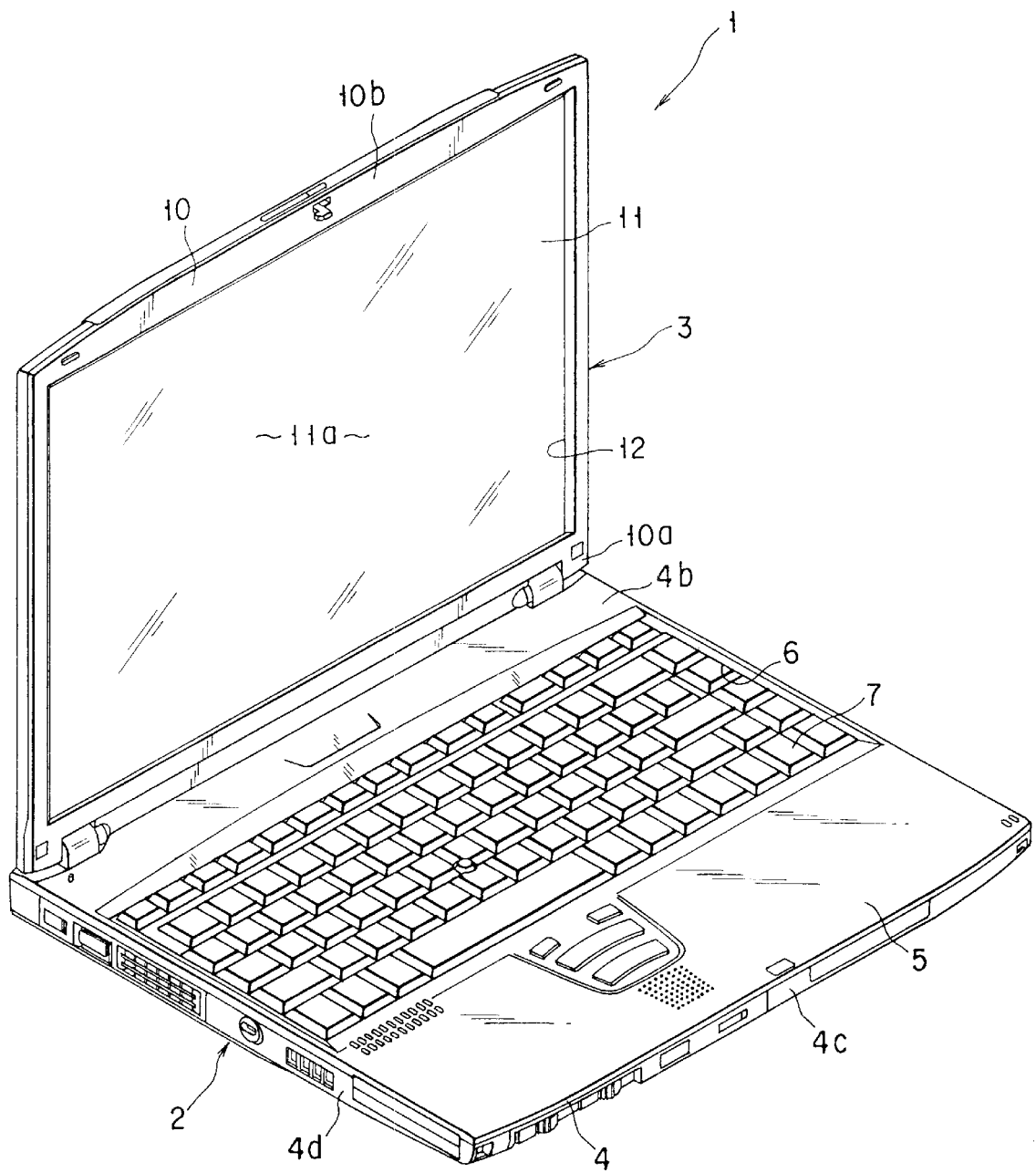
FIG. 1 is a perspective view of a portable computer according to a first embodiment of the present invention.
Figure 2:
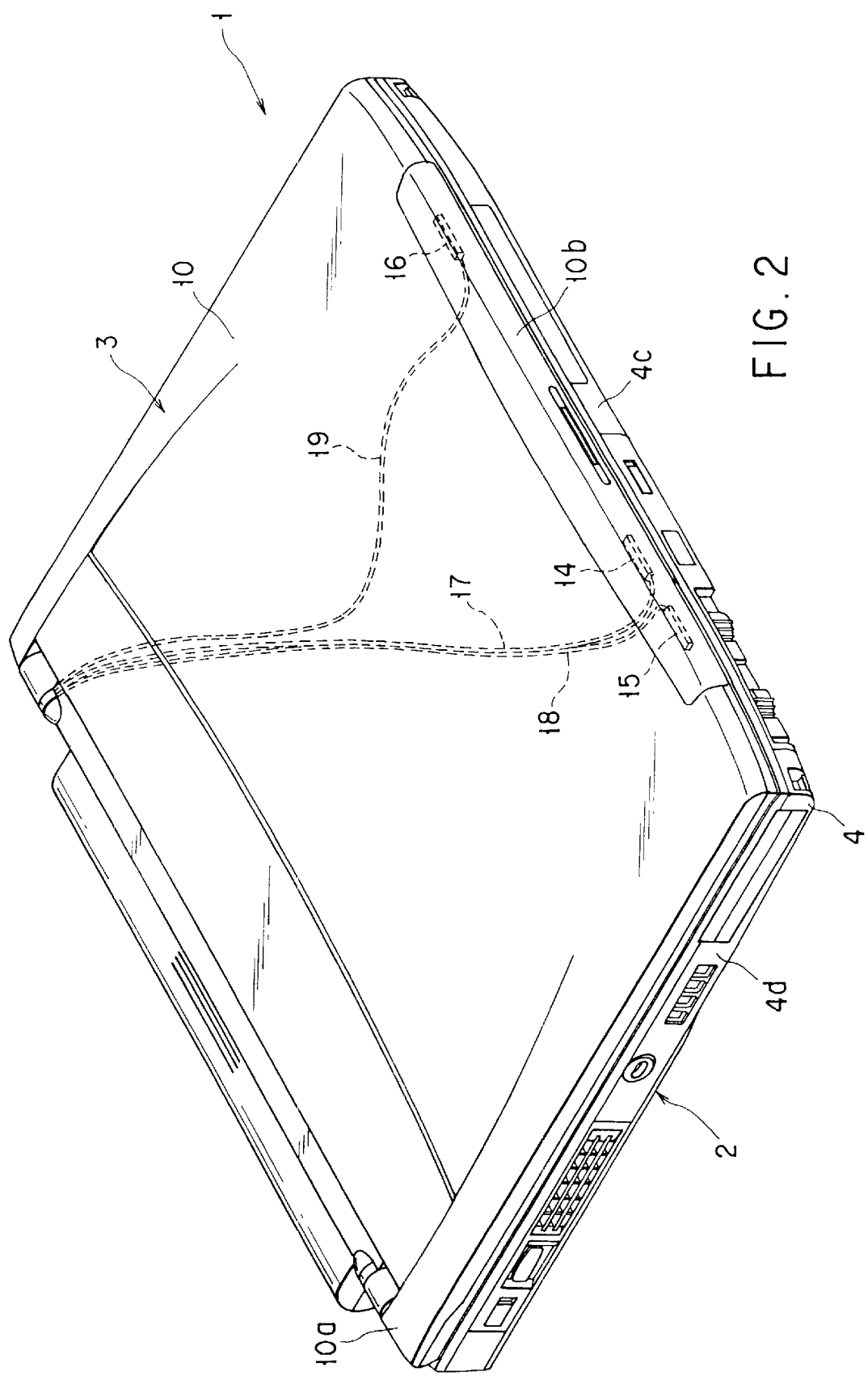
FIG. 2 is a perspective view of the portable computer according to the first embodiment of the present invention, which shows a relationship in position between a display housing of a display unit and first and second antenna elements included in the display housing.

FIGS. 1 and 2 illustrate a portable computer 1 as an electronic apparatus. The portable computer 1 comprises a main body 2 and a display unit 3. The main body 2 includes a flat box-shaped housing 4. The housing 4 includes a circuit board mounted with, e.g., a microprocessor, a hard disk drive, and a DVD drive.

The housing 4 has a bottom wall 4a, a top wall 4b, a front wall 4c, right and left sidewalls 4d, and a rear wall (not shown). The top wall 4b includes a palm rest 5 and a keyboard mounting opening 6. The palm rest 5 is formed on the front half of the top wall 4b, while the keyboard mounting opening 6 is formed behind the palm rest 5. A keyboard 7 is mounted in the keyboard mounting opening 6.

The display unit 3 includes a display housing 10 and a liquid crystal display device 11 housed in the display housing 10. The display housing 10 is flat and shaped like a box having an opening 12 on the front thereof. The liquid crystal display device 11 includes a display screen 11a for displaying information such as characters and images. The display screen 11a is exposed outside the display housing 10 through the opening 12.

The display housing 10 includes a first end portion 10a adjacent to a rear end portion of the housing 4 and a second end portion 10b opposite to the first end portion 10a. The first end portion 10a of the display housing 10 is supported on the rear end portion of the housing 4 by means of a hinge device (not shown). The display unit 3 can thus be turned between a closed position where the unit 3 is folded so as to cover the palm rest 5 and keyboard 7 from above and an opened position where it is raised so as to expose the palm rest 5, keyboard 7 and display screen 11a.

As illustrated in FIG. 2, the display unit 3 includes a first antenna element 14 for Bluetooth™ that is one of short-range wireless communication standards and a pair of second antenna elements 15 and 16 that configure a diversity antenna for use in a wireless LAN. These first and second antenna elements 14, 15 and 16 are located on the second end portion 10b of the display housing 10 and arranged in line along the width direction of the display housing 10.

Thus, when the display unit 3 is turned to the opened position, the first and second antenna elements 14, 15 and 16 are situated farthest from the main body 2 of the computer 1.

As shown in FIG. 2, first to third antenna cables 17, 18 and 19 are connected to the first and second antenna elements 14, 15 and 16, respectively. These antenna cables 17, 18 and 19 are formed of, e.g., coaxial cables. The antenna cables 17, 18 and 19 are guided inside the housing 4 from the first end portion 10a of the display housing 10. The cables 17, 18 and 19 each have one end opposite to the antenna elements 14, 15 and 16. One end of each of the antenna cables 17, 18 and 19 is located inside the housing 4. Disk-shaped connecting terminals 17a, 18a and 19a are attached to their respective ends of the antenna cables 17, 18 and 19.

Figure 3:
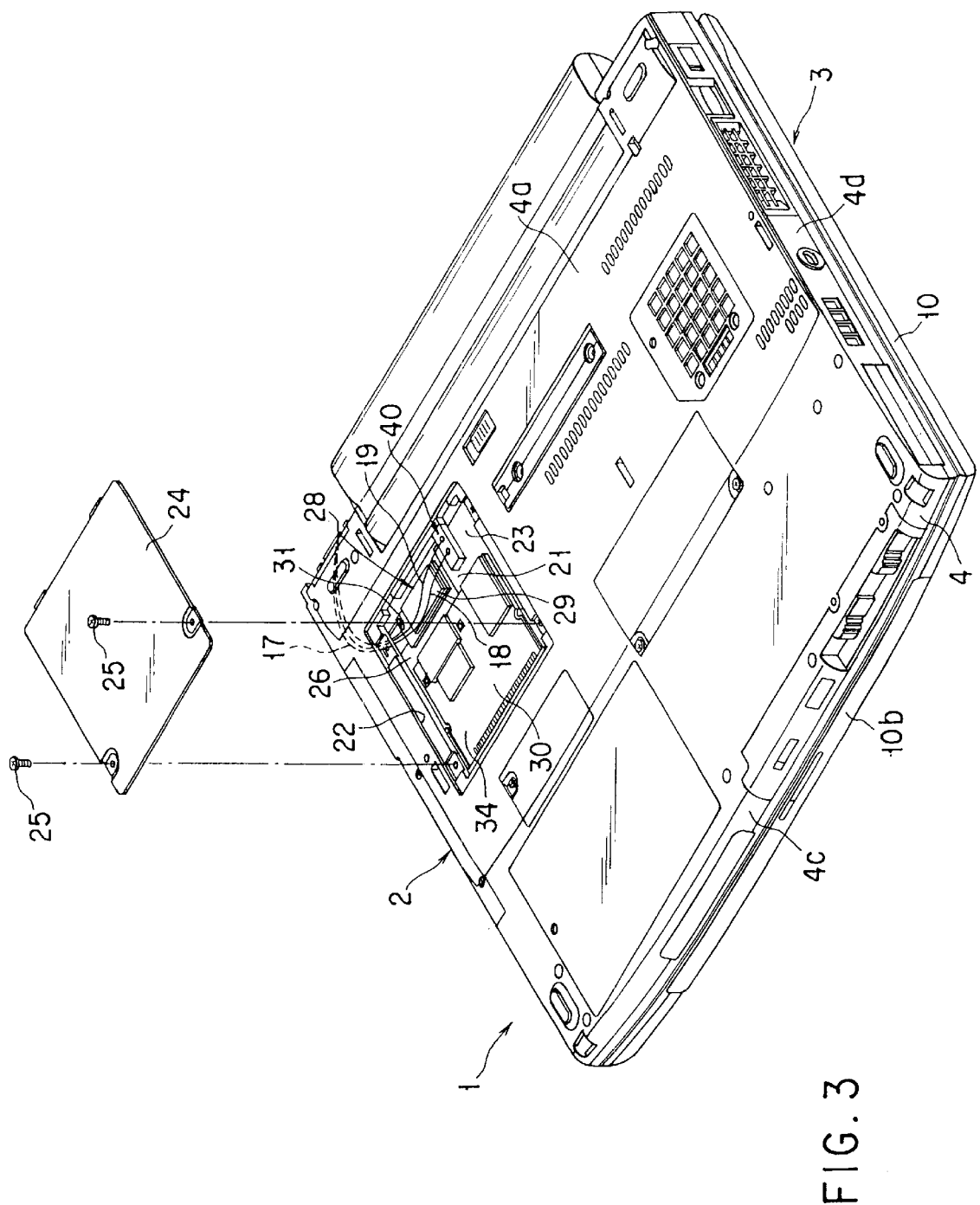
FIG. 3 is a perspective view of the portable computer according to the first embodiment of the present invention, which shows a wireless communication unit stored in a storage section of the main body.
Figure 4:
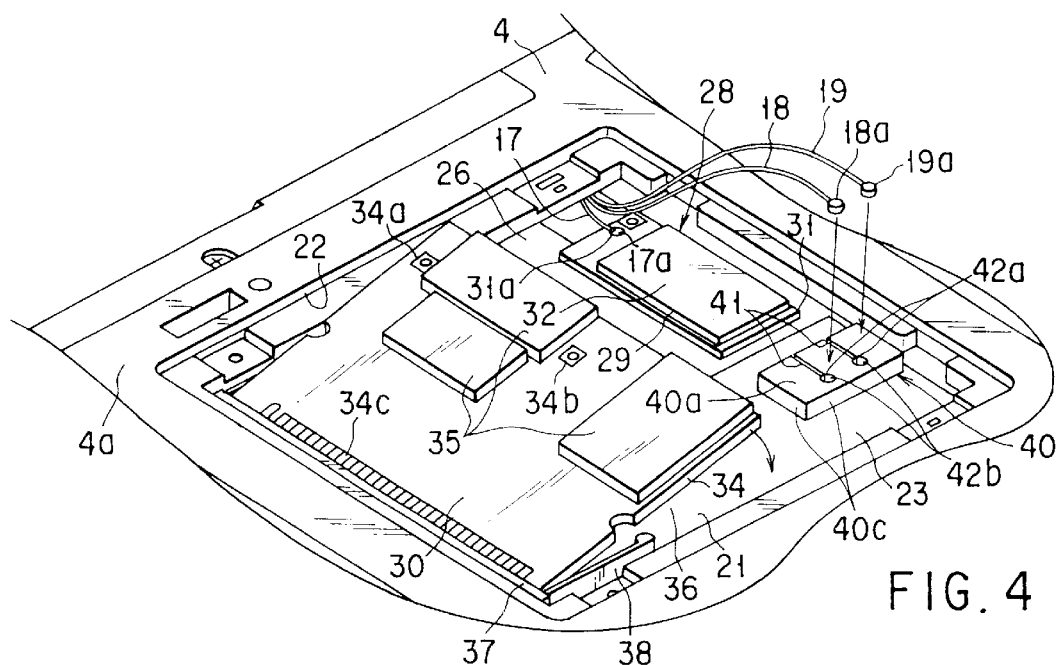
FIG. 4 is a perspective view of the storage section of the portable computer according to the first embodiment, which shows a relationship in position between a plurality of antenna cables and a holding member.

Referring to FIGS. 3 and 4, the housing 4 has a storage section 21 on its bottom. The storage section 21 includes a rectangular opening section 22 formed in the bottom wall 4a and a top plate section 23 opposed to the opening section 22. The top plate section 23 is located closer to the inner side of the housing 4 than the opening section 22 and maintained at a ground potential. The opening section 22 is covered with a cover 24. The cover 24 is removably attached to the bottom wall 4a by two screws 25.

Figure 5:
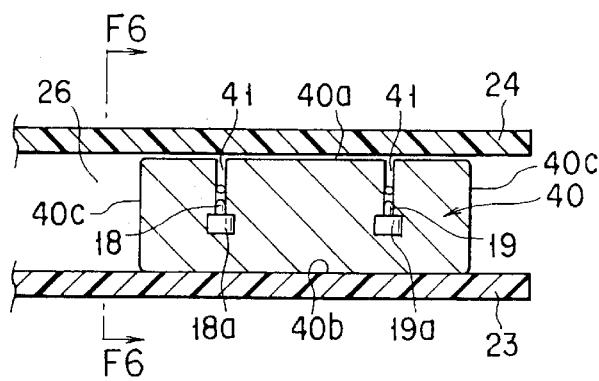
FIG. 5 is a cross-sectional view of the storage section of the portable computer according to the first embodiment, which shows the connecting terminals of the plurality of antenna cables are buried into the holding member.
Figure 6:
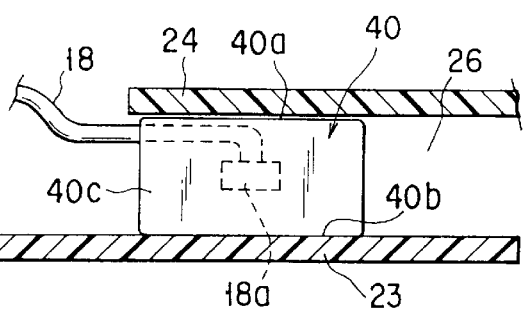
FIG. 6 is a cross-sectional view taken along line F6—F6 of FIG. 5.

As is seen from FIG. 5, the cover 24 and top plate section 23 form a flat storage room 26 therebetween. The storage room 26 communicates with the inside of the housing 4. One end of each of the first to third antenna cables 17, 18 and 19 formed inside the housing 4 is led to the storage room 26. Thus, the first to third antenna cables 17, 18 and 19 are formed between the antenna elements 14, 15 and 16 and the storage room 26.

As shown in FIG. 4 most clearly, the storage room 26 stores a wireless communication unit 28. The unit 28 comprises a first wireless communication device 29 for use in Bluetooth™ and a second wireless communication device 30 for use in a wireless LAN. The first wireless communication device 29 includes a circuit board 31 having an antenna input terminal 31a and a chip component 32 mounted on the circuit board 31. The circuit board 31 is fixed on the top plate section 23 of the storage section 21. The connecting terminal 17a of the first antenna cable 17 that is led to the storage room 26 is connected to the antenna input terminal 31a of the circuit board 31. Therefore, the first wireless communication device 29 is originally stored in the storage section 21 of the housing 4 and kept in connection with the first antenna element 14 through the first antenna cable 17.

The second wireless communication device 30 is an option that is added to the storage section 21 when the need arises. The device 30 includes a circuit board 34, a plurality of chip components 35 mounted on the circuit board 34. The circuit board 34 has a pair of antenna input terminals 34a and 34b and a terminal section 34c situated at one end portion of the circuit board 34. The connecting terminals 18a and 19a of the second and third antenna cables 18 and 19 are connected to their respective antenna input terminals 34a and 34b.

The top plate section 23 of the storage section 21 has an additional region 36. The additional region 36 is formed alongside of the first wireless communication device 29. A connector 37 and a lock mechanism 38 are arranged in the additional region 36.

In order to add the second wireless communication device 30 to the storage section 21 of the housing 4, the cover 24 is detached from the bottom wall 4a of the housing 4 to open the storage room 26 through the opening section 22. Then, the device 30 is inserted into the storage room 26 from the opening section 22 with the terminal section 34c of the circuit board 34 at the head of the board 34. After the terminal section 34c is fitted into the connector 37, the circuit board 34 is turned down with regard to the fitting section of the terminal section 34c and connector 37. Thus, the circuit board 34 overlaps the top plate section 23, and the lock mechanism 38 is caught in the circuit board 34. As a result, the second wireless communication device 30 is held in the storage room 26.

The connecting terminals 18a and 19a of the second and third antenna cables 18 and 19 are connected to the antenna input terminals 34a and 34b of the circuit board 34, respectively. Then, the second wireless communication device 30 is connected to the second antenna elements 15 and 16 via the second and third antenna cables 18 and 19, respectively. Finally, the cover 24 covers the opening section 22 and is fixed to the bottom wall 4a by means of the screws 25. Thus, the addition of the second wireless communication device 30 to the storage section 21 of the housing 4 is completed.

As shown in FIGS. 3 to 6, a shield gasket 40 is disposed as a holding member in the storage section 21. The shield gasket 40 is used to hold the second and third antenna cables 18 and 19 leading to the storage room 26 when the second wireless communication device 30 is detached from the storage room 26. The shield gasket 40 is made of, e.g., a rubber-like elastic member having conductivity. The gasket 40 is shaped like a block having a top surface 40a, an undersurface 40b, and four sides 40c. The undersurface 40b of the gasket 40 is adhered to the top plate section 23 by a conductive adhesive (not shown). Thus, the shield gasket 40 is fixed in a given position in the storage room 26 and maintained at a ground potential through the housing 4.

The shield gasket 40 includes a pair of slits 41. The slits 41 are arranged in parallel at regular intervals and continuously formed in the top surface 40a and one of the sides 40c of the shield gasket 40. Each of the slits 41 includes a cable holding section 42a and a terminal holding section 42b. The cable holding sections 42a of the slits 41 hold the second and third antenna cables 18 and 19 such that they can detach one end of each of the cables. The cable holding sections 42a are formed on the top surface 40a and one of the sides 40c of the shield gasket 40. The terminal holding sections 42b are formed continuously with their respective cable holding sections 42a. The terminal holding sections 42b detachably hold the connecting terminals 18a and 19a and are formed on only the top surface 40a of the shield gasket 40.

When the second wireless communication device 30 is detached from the storage room 26 of the housing 4, the second and third antenna cables 18 and 19 are held in a position in the storage room 26. More specifically, one end of each of the second and third antenna cables 18 and 19 is fitted into its corresponding one of the cable holding sections 42a of the slits 41. The connecting terminals 18a and 19a at the ends of the antenna cables 18 and 19 are fitted into the terminal holding sections 42b. Thus, the ends of the antenna cables 18 and 19 and the connecting terminals 18a and 19a are buried and held in the shield gasket 40.

According to the above configuration, when the second wireless communication device 30 is detached from the storage room 26 of the housing 4, the second and third antenna cables 18 and 19, which are to be connected to the wireless communication device 30, are fitted into their respective slits 41 of the shield gasket 40 that is fixed on the top plate section 23. Therefore, the second and third antenna cables 18 and 19 are held in a position in the storage room 26 through the shield gasket 40. Even though the housing 4 is vibrated when the portable computer 1 is carried, the ends and connecting terminals 18a and 19a of the second and third antenna cables 18 and 19 are not moved freely in the storage room 26. Consequently, the connecting terminals 18a and 19a do not collide with the first wireless communication device 29 or the inner surface of the storage section 21, thereby preventing the connecting terminals 18a and 19a and first wireless communication device 29 from being damaged.

Moreover, the second and third antenna cables 18 and 19 can be released from the storage section 21 only by drawing the ends and connecting terminals 18a and 19a of the second and third antenna cables 18 and 19 from the slits 41. As compared with the prior art using an adhesive tape, therefore, a preparatory operation, which is performed before the second wireless communication device 30 is added to the storage section 21, can easily be performed, and the operability for adding the second wireless communication device 30 becomes satisfactory.

Since the shield gasket 40 is fixed in a predetermined position of the storage section 21, the positions of ends of the second and third antenna cables 18 and 19 do not vary from portable computer to portable computer. Since, moreover, the position and shape of the shield gasket 40 are fixed in the storage room 26, the inside of the room 26 can be simplified. Thus, when the cover 24 is removed to open the storage room 26, the appearance of the room 26 is enhanced and an adverse effect is not exerted on the commercial value of the apparatus.

According to the above configuration, when the ends of the second and third antenna cables 18 and 19 are fitted into the slits 41 of the shield gasket 40, the connecting terminals 18a and 19a are buried into the gasket 40. For this reason, the unused connecting terminals 18a and 19a are maintained at a ground potential through the housing 4 to prevent an adverse effect of undesired electromagnetic waves from and into the second antenna elements 15 and 16 upon a circuit. It is thus possible to strengthen measures against EMI (electromagnetic interference) and thus improve the reliability of the apparatus.

Since the connecting terminals 18a and 19a, which are buried into the shield gasket 40, are held in position in the storage room 26, an interference of high-frequency signals can be prevented from occurring between the first wireless communication device 29 originally stored in the storage room 26 and the unused connecting terminals 18a and 19a.

Figure 7:
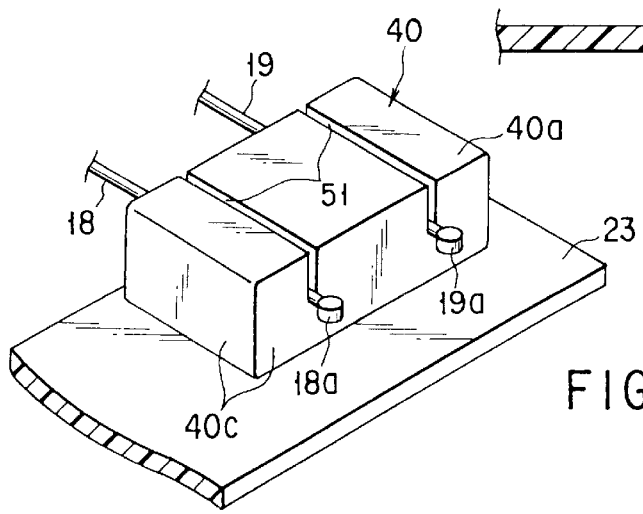
FIG. 7 is a perspective view of a second embodiment of the present invention, in which a holding member holds one end of each of a plurality of antenna cables.

The present invention is not limited to the first embodiment described above. FIG. 7 illustrates a second embodiment of the present invention. The second embodiment differs from the first embodiment in the configuration for holding the unused second and third antenna cables 18 and 19 and they are similar to each other in the basic configuration of the portable computer 1. In the second embodiment, therefore, the same components as those of the first embodiment are indicated by the same reference numerals and their descriptions are omitted.

The shield gasket 40 shown in FIG. 7 includes a pair of slits 51. The slits 51 are arranged in parallel at regular intervals. The slits 51 are continuously formed in the top surface 40a of the shield gasket 40, one side 40c thereof, and another side 40c opposed to the one side 40c.

One end of each of unused second and third antenna cables 18 and 19 is fitted into its corresponding one of the slits 51. In this case, the ends of the antenna cables 18 and 19 penetrate the slits 51, and connecting terminals 18a and 19a communicating with the ends of the antenna cables 18 and 19 are projected from the shield gasket 40.

The above configuration of the second embodiment allows the unused second and third antenna cables 18 and 19 to be held in position in the storage room 26 through the shield gasket 40. Furthermore, the connecting terminals 18a and 19a can be brought into contact with the shield gasket 40 and maintained at a ground potential. It is therefore possible to prevent an adverse effect of undesired electromagnetic waves from and into the second antenna elements 15 and 16 upon the personal computer 1.

The holding member of the present invention need not always be made of a rubber-like elastic member having conductivity. For example, it can be made of a rubber-like elastic member coated with metal foil.

In addition, the wireless communication unit stored in the storage section of the housing is not limited to one having both a first wireless communication device for use in Bluetooth and a second wireless communication device for use in an LAN. For example, the wireless communication unit can have only one of the first and second wireless communication devices or another wireless communication device.

The electronic apparatus of the present invention is not limited to a portable computer. For example, even though the apparatus is another portable information tool such as PDA (personal digital assistants).

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus comprising:
    a main body having a storage section which stores a wireless communication unit;
    an antenna element for use in wireless communication, arranged at a distance from the storage section;
    an antenna cable formed between the storage section and the antenna element, the antenna cable having one end led to the storage section, and the one end of the antenna cable being connected to the wireless communication unit; and
    a holding member fixed in the storage section, the holding member being detachably caught by the one end of the antenna cable to hold the one end of the antenna cable in position in the storage section.

2. The electronic apparatus according to claim 1, wherein the wireless communication unit includes a first wireless communication device and a second wireless communication device, the first wireless communication device being originally stored in the storage section and the second wireless communication device being selectively added to the storage section when necessary, and the one end of the antenna cable is connected to the second wireless communication device.

3. The electronic apparatus according to claim 1, wherein the one end of the antenna cable has a connecting terminal, and the holding member has a slit into which the one end of the antenna cable is detachably buried.

4. The electronic apparatus according to claim 1, wherein the main body includes a bottom wall in which an opening communicating with the storage section is formed, the opening being covered with a removable cover.

5. The electronic apparatus according to claim 3, wherein the holding member has conductivity.

6. An electronic apparatus comprising:
    a main body having a storage section which stores a wireless communication unit;
    a cover supported by the main body, the cover being allowed to turn between a closed position where the cover is folded so as to cover the main body from above and an opened position where the cover is raised from the main body;
    an antenna element for use in wireless communication, incorporated in the cover;
    an antenna cable formed between the storage section and the antenna element, the antenna cable having one end led to the storage section, and the one end of the antenna cable being connected to the wireless communication unit; and
    a holding member fixed in the storage section, the holding member being detachably caught by the one end of the antenna cable to hold the one end of the antenna cable in position in the storage section.

7. The electronic apparatus according to claim 6, wherein the one end of the antenna cable has a connecting terminal connected to the wireless communication unit, and the holding member is made of conductive materials and has a slit into which the connecting terminal of the antenna cable is detachably buried.

8. The electronic apparatus according to claim 6, wherein the cover includes a first end portion supported by the main body and a second end portion located opposite to the first end portion and moving farthest from the main body when the cover is turned to the opened position and said antenna element is located on the second end portion of the cover.

9. The electronic apparatus according to claim 7, wherein the wireless communication unit includes a first wireless communication device and a second wireless communication device, the first wireless communication device being originally stored in the storage section and the second wireless communication device being selectively added to the storage section when necessary, and the connecting terminal of the antenna cable is detached from the holding member and connected to the second wireless communication device when the second wireless communication device is added to the storage section.

10. An electronic apparatus comprising:

a main body having a storage section;

a cable having one end led to the storage section of the main body;

a holding member fixed in the storage section, the holding member being detachably caught by the one end of the cable to hold the one end of the cable in position in the storage section; and an option device selectively added to the storage section, the one end of the cable being detached from the holding member and connected to the option device when the option device is added to the storage section.

11. The electronic apparatus according to claim 10, wherein the holding member is made of conductive materials, maintained at a ground potential, and has a slit into which the one end of the cable is detachably buried.

12. An electronic apparatus comprising:

a main body having a storage section which stores a wireless communication unit;

an antenna element for use in wireless communication, arranged at a distance from the storage section;

an antenna cable formed between the storage section and the antenna element, the antenna cable having one end led to the storage section, and the one end of the antenna cable comprising a connecting terminal connected to the wireless communication unit; and a holding member which has conductivity and into which the connecting terminal is detachably buried, the holding member being fixed in the storage section, and the connecting terminal being buried into the holding member to hold the one end of the antenna cable in position in the storage section.

13. The electronic apparatus according to claim 12, wherein the holding member is maintained at a ground potential.

14. The electronic apparatus according to claim 13, wherein the holding member comprises a cable holding section into which the one end of the antenna cable is buried and a terminal holding section into which the connecting terminal is buried.

* * * * *